United States Patent
Okada

(10) Patent No.: US 6,169,386 B1
(45) Date of Patent: Jan. 2, 2001

(54) METHOD FOR CHARGING LEAD-ACID BATTERY AND CHARGING APPARATUS USING THE METHOD

(75) Inventor: Yuichi Okada, Kyoto (JP)

(73) Assignee: Japan Storage Battery Co., Ltd., Kyoto (JP)

(*) Notice: Under 35 U.S.C. 154(b), the term of this patent shall be extended for 0 days.

(21) Appl. No.: 09/369,150

(22) Filed: Aug. 5, 1999

(30) Foreign Application Priority Data

Aug. 5, 1998 (JP) .................................................. 10-234949

(51) Int. Cl.[7] ...................................................... H02J 7/00
(52) U.S. Cl. ............................................. 320/128; 320/127
(58) Field of Search ................................. 320/128, 127, 320/137, 130, 132

(56) References Cited

U.S. PATENT DOCUMENTS

| | | | |
|---|---|---|---|
| 4,295,097 | * 10/1981 | Thompson et al. | 324/429 |
| 5,298,350 | * 3/1994 | Rao | 429/245 |
| 5,808,445 | * 9/1998 | Aylor et al. | 320/132 |

* cited by examiner

*Primary Examiner*—Peter S. Wong
*Assistant Examiner*—Lawrence Luk
(74) *Attorney, Agent, or Firm*—Sughrue, Mion, Zinn, Macpeak & Seas, PLLC

(57) ABSTRACT

In a method for charging a lead-acid battery having a non-antimony-lead alloy grid, after charging the battery, the battery is incidentally discharged in such a manner that the voltage of said battery which has been incidentally discharged per cell falls below the sum of 70 mV and equilibrium voltage that is an open circuit voltage of the battery in equilibrium state after being fully charged.

6 Claims, 1 Drawing Sheet

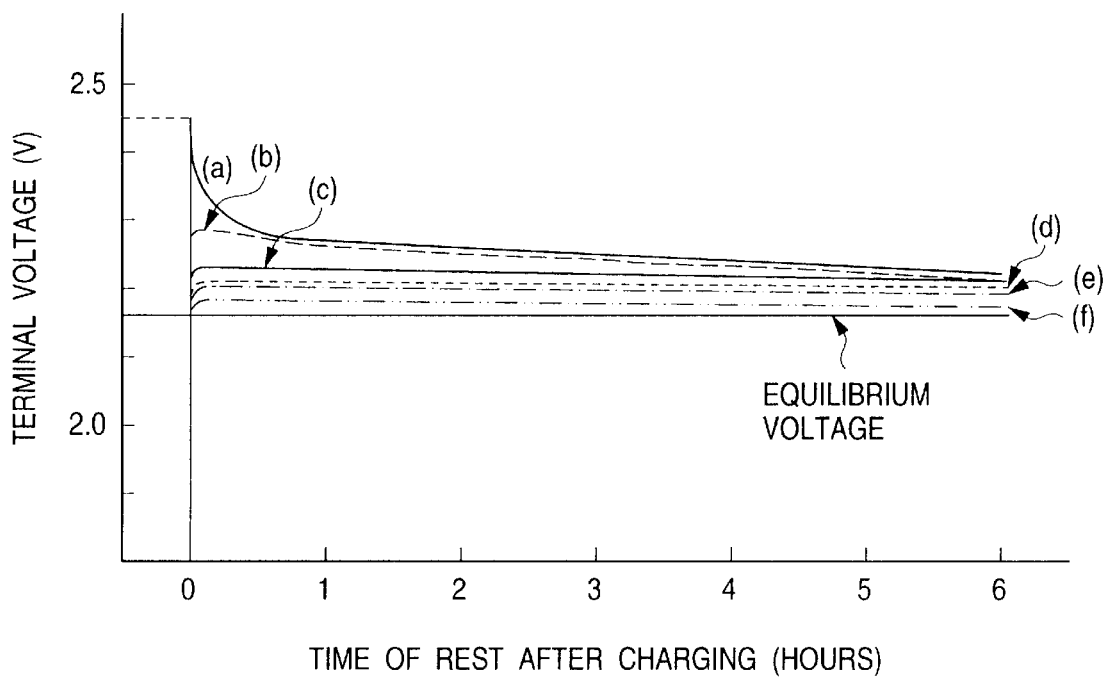
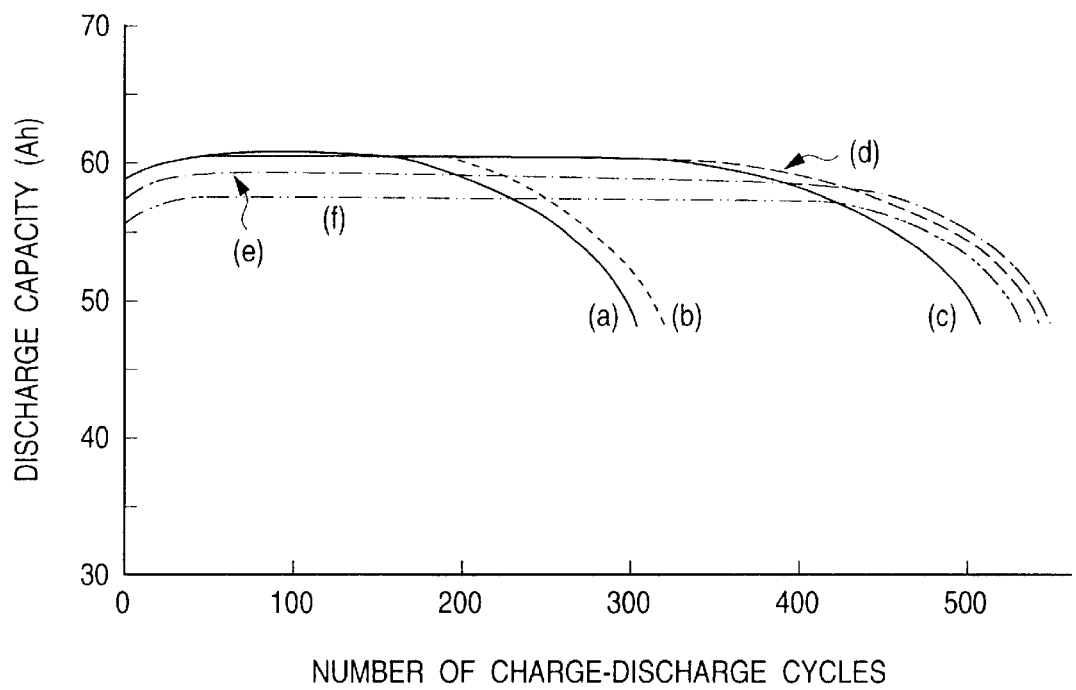

METHOD FOR CHARGING LEAD-ACID BATTERY AND CHARGING APPARATUS USING THE METHOD

BACKGROUND OF THE INVENTION

1. Field of the Invention

The present invention relates to a method for charging a lead-acid battery employing a non-antimony-lead alloy grid, and a charging apparatus using the method.

2. Description of the Related Art

The plate grid for a lead-acid battery has heretofore been mostly made of a lead-antimony alloy having an antimony content of not less than 1% by weight. Maintenance-free type lead-acid storage batteries which do not require maintenance such as replenishment with water normally comprise a non-antimony-lead alloy (alloys other than lead-antimony alloy having an antimony content of not less than 1% by weight will be hereinafter referred to as "non-antimony-lead alloy") such as lead-calcium alloy to prevent the loss of water from the electrolyte.

A corrosion layer is formed on the positive plate grid in a lead-acid battery. When a battery using a non-antimony-lead alloy is repeatedly charged and discharged, the corrosion layer on the grid is discharged to form a barrier layer of lead sulfate at the interface of the positive plate grid with the active material, causing premature capacity loss.

SUMMARY OF THE INVENTION

It is an object of the present invention to provide a method for charging a lead-acid battery using a non-antimony-lead alloy grid, which is capable of suppressing the production of a barrier layer at the interface of the grid with the active material.

According to the present invention, a method for charging a lead-acid battery having a non-antimony-lead alloy grid, comprises the steps of: charging said battery; and after the charging step, incidentally discharging said battery in such a manner that the voltage of said battery which has been incidentally discharged per cell falls below the sum of 70 mV and equilibrium voltage that is an open circuit voltage of said battery in equilibrium state after being fully charged.

The present invention provides a charging apparatus using the above method.

BRIEF DESCRIPTION OF THE DRAWINGS

In the accompanying drawings:

FIG. 1 is a graph illustrating the change of the voltage of batteries which have been charged; and FIG. 2 is a graph illustrating the change of the capacity of a battery in cycle life test.

DETAILED DESCRIPTION OF THE INVENTION

The detailed description of the present invention will be described as follows.

The present invention has been worked out on the basis of a new knowledge that the shorter the period of time during which the positive plate is at a higher potential than its equilibrium voltage is, the more difficulty can be formed the barrier layer and the longer is the life of the battery. Namely, in the present invention, the cell voltage is lowered to around the equilibrium voltage immediately after the termination of charging to reduce the period of time during which the positive plate is exposed to a high potential. Consequently, it is possible to suppress the production of a barrier layer at the interface of the grid with the active material.

Strictly speaking, the equilibrium voltage means the electromotive force of a battery determined from the concentration of the electrolyte (dilute sulfuric acid) and the battery temperature. However, the equilibrium voltage herein represents the voltage of a battery which has been allowed to stand open-circuited for 3 days after fully charged. Strictly speaking, the fully charged state means the state in which the active material is fully charged. However, the fully charged state represents the state in which the battery is charged to a voltage exceeding the equilibrium voltage. Further, the equilibrium potential of the positive plate represents the potential of the positive plate corresponding to the equilibrium voltage of the cell.

The positive plate is at a higher potential than the equilibrium potential mostly during charging. Therefore, if charging is effected with a large current to reduce the charging time, the period of time during which the positive plate is at a high potential can be reduced. However, even if charging is terminated, the battery voltage does not readily fall to the equilibrium potential. Thus, the positive plate is kept at a high potential for a considerably long period of time. Accordingly, in order to further reduce the period of time during which the positive plate is kept at a high potential, it is necessary to lower the potential of the positive plate to a value around the equilibrium potential readily after the termination of charging.

In the present invention, the cell is discharged immediately after the termination of charging, and the period of time during which the positive plate is exposed to a high potential can be reduced to suppress the production of a barrier layer at the grid interface. Accordingly, it is possible to prolong the battery life.

The term "incidental discharging" as used herein means to indicate incidental discharging effected immediately after ordinary charging step, which is included in the charging method of the present invention.

The method for charging a lead-acid battery according to the present invention includes incidentally discharging a lead-acid battery, which has been charged in such a manner that the open circuit voltage of the battery is not 70 mV higher than the equilibrium voltage per cell.

In the conventional charging process, a battery which has been charged shows a voltage that is initially high and then gradually approaches the equilibrium voltage. Thus, the positive plate is kept exposed to a high potential for a considerably long period of time. On the other hand, if the battery which has been charged is incidentally discharged, its voltage falls to around the equilibrium voltage immediately after the termination of energization. Accordingly, it is possible to suppress the production of a barrier layer and hence, drastically prolonging the life of the battery. The incidental discharging may be effected in such a manner that the voltage of the battery which has been incidentally discharged approaches the equilibrium voltage as much as possible. However, it is necessary that the incidental discharging be effected in such a manner that the voltage of the battery which has been thus incidentally discharged is not 70 mV higher than the equilibrium voltage per cell.

If a battery which has been charged is incidentally discharged, its dischargeable capacity is reduced so much. Therefore, the quantity of electricity thus incidentally discharged is preferably as small as possible. However, in order to keep the voltage of the battery which has been incidentally discharged to less than 70 mV higher than the equilibrium voltage per cell, the quantity of electricity thus incidentally discharged needs only to be from not less than 0.1% to not more than 1% of the rated capacity. When the quantity of electricity thus incidentally discharged falls within this range, it has little or no practical effect on the dischargeable capacity.

EXAMPLE

The present invention will be further described in the following examples.

Positive and negative plates obtained by filling a grid made of lead-0.1% calcium alloy with an active material, and then subjecting the plates to chemical formation were superposed upon each other with a fine glass fiber separator provided interposed therebetween to form an plate block. Dilute sulfuric acid having a specific gravity of 1.32 (20° C.) was then absorbed by and retained in the plate block to prepare 2V-60 Ah valve-regulated lead-acid batteries.

The lead-acid batteries thus prepared were then subjected to charge-discharge cycle life test at room temperature (25° C.) in accordance with the conventional charging methods and the charging method of the present invention. During the cycle life test, discharging was effected with 20 A (⅓ CA) until the battery voltage fell to 1.65 V. Charging was effected under the following testing conditions:

(a) Charged at a constant current-constant voltage process, i.e., 12 A (0.2 CA)-2.45 V for 8 hours;

(b) Charged at a constant current-constant voltage process, i.e., 12 A (0.2 CA)-2.45 V for 8 hours and then incidentally discharged with 60 A (1 CA) for 1 second to terminate a charging process;

(c) Charged at a constant current-constant voltage process, i.e., 12 A (0.2 CA)-2.45 V for 8 hours and then incidentally discharged with 60 A (1 CA) for 10 seconds to terminate a charging process;

(d) Charged at a constant current-constant voltage process, i.e., 12 A (0.2 CA)-2.45 V for 8 hours and then incidentally discharged with 60 A (1 CA) for 30 seconds to terminate a charging process;

(e) Charged at a constant current-constant voltage process, i.e., 12 A (0.2 CA)-2.45 V for 8 hours and then incidentally discharged with 60 A (1 CA) for 1 minute to terminate a charging process; and (f) Charged at a constant current-constant voltage process, i.e., 12 A (0.2 CA)-2.45 V for 8 hours and then incidentally discharged with 60 A (1 CA) for 3 minutes to terminate a charging process.

These charging processes were each followed by 6 hours of rest prior to the subsequent discharging for cycle test.

FIG. 1 is a graph illustrating the change of the voltage of batteries which have been rested after charged. Table 1 shows the voltage of a battery shown 5 minutes after the termination of charging.

TABLE 1

| Charging conditions | Open circuit voltage (V) after the termination of charging | Difference (mV) from the equilibrium voltage (equilibrium voltage: 2.16 V) |
| --- | --- | --- |
| (a) | 2.35 | 190 |
| (b) | 2.28 | 120 |
| (c) | 2.23 | 70 |
| (d) | 2.21 | 50 |
| (e) | 2.20 | 40 |
| (f) | 2.18 | 20 |

It can be seen in FIG. 1 that the batteries (a) and (b) are kept at a voltage of 70 mV or more higher than the equilibrium voltage for a long period of time during rest following the termination of charging while the batteries (c), (d), (e) and (f) each show a voltage almost equal to the equilibrium voltage (not 70 mV higher than the equilibrium voltage) immediately after the termination of incidental discharging. FIG. 2 illustrates the change of capacity during the cycle life test. When a battery is not incidentally discharged after charged in accordance with the conventional process as shown in Example (a) and a battery which has been incidentally discharged is kept at a voltage of 70 mV or more higher than the equilibrium voltage as shown in Example (b), a barrier layer can be easily produced to reduce the battery life to about 300 cycles.

On the other hand, when a battery is incidentally discharged in such a manner that the battery voltage is not kept at a voltage of 70 mV or more higher than the equilibrium voltage during rest following charging as shown in Examples (c), (d), (e) and (f), the production of a barrier layer can be suppressed to prolong the battery life to about 500 cycles. In the case of Examples (c) and (d), the quantity of electricity incidentally discharged is so small as not more than 1% of the rated dischargeable capacity that there are no adverse effects such as decrease of discharge capacity. However, in the case of Examples (e) and (f), the quantity of electricity incidentally discharged is from about 2 to 5% of the rated dischargeable capacity, and the dischargeable capacity is reduced. Accordingly, in order to minimize the decrease of discharge capacity, the quantity of electricity incidentally discharged is preferably as small as possible unless the battery voltage reaches the value 70 mV higher than the equilibrium voltage of the battery or more after he incidental discharge.

In the present example, incidental discharging was effected with a constant current. However, incident discharging doesn't necessarily need to be effected with a constant current. Even when the battery is incidentally discharged through a resistor or capacitor connected thereto, similar effects can be exerted.

In the foregoing example, the entire charging process was terminated by incidental discharging. However, even when charged again, similar effects can be exerted so far as the battery voltage does not reach a voltage of 70 mV or more higher than the equilibrium voltage. For example, even if a battery which has been float-charged is incidentally discharged when it reaches fully charged state, and then charged again with the charging voltage being kept at not more than the sum of the equilibrium voltage and 70 mV, similar effects can be exerted. An example of this process will be described hereinafter.

Positive and negative plates obtained by filling a grid made of lead-0.1% calcium-1.0% tin alloy with an active material, and then subjecting the plate to chemical formation were superposed upon each other with a fine glass fiber separator provided interposed therebetween to form an plate block. Dilute sulfuric acid having a specific gravity of 1.26 (20° C.) was then absorbed by and retained in the plate block to prepare a 2V-60 Ah valve-regulated lead-acid battery.

The lead-acid batteries thus prepared were then subjected to float life test at room temperature (25° C.) in accordance with the conventional charging methods and the charging method of the present invention. During the float life test, discharging was effected once per about 1 month with 0.6 A (0.1 CA) until the battery voltage fell to 1.75V. Charging was effected under the following two testing conditions:

(g) Charged at a constant current-constant voltage process, i.e., 1.2 A (0.2 CA)-2.23 V for about 1 month; and (h) Charged at a constant current-constant voltage process, i.e., 1.2 A (0.2 CA)-2.30 V for 12 hours, incidentally discharged to a battery voltage of 2.16 V, and subsequently charged with 12 A (0.2 CA)-2.16 V for about 1 month.

When a battery which has been charged is then processed without being incidentally discharged in accordance with the conventional process as shown in Example (g), a barrier layer is produced at the interface of the grid with the active material. The dischargeable capacity is reduced to 50% of the initial value in about 4 years.

On the other hand, when a battery which has been fully charged is incidentally discharged in such a manner that the battery voltage is not kept at a voltage of 70 mV or more higher than the equilibrium voltage, and then again charged with the charging voltage being kept at not more than the sum of the equilibrium voltage and 70 mV as in Example (h) of the present invention, the production of a barrier layer was suppressed, and the battery kept about 95% of it's initial capacity value even after 4 years.

What is claimed is:

1. A method for charging a lead-acid battery having a non-antimony-lead alloy grid, comprising the steps of:

charging said battery; and after charging, incidentally discharging said battery to a voltage per cell of less than 70 mV above an equilibrium voltage, wherein said equilibrium voltage is an open circuit voltage of said battery in an equilibrium state after being fully charged.

2. The method for charging a lead-acid battery according to claim 1, wherein the quantity of electricity incidentally discharged is in a range of 0.1% to 1% of a rated capacity of said battery.

3. The method for charging a lead-acid battery according to claim 1, wherein said incidental discharging is followed by charging in such a manner that the cell voltage does not reach a value 70 mV higher than the equilibrium voltage of the battery.

4. A charging apparatus employing a charging method for charging a lead-acid battery having a non-antimony-lead alloy grid, comprising the steps of:

charging said battery; and after charging, incidentally discharging said battery to a voltage per cell of less than 70 mV above an equilibrium voltage, wherein said equilibrium voltage is an open circuit voltage of said battery in an equilibrium state after being fully charged.

5. The apparatus according to claim 4, wherein the quantity of electricity incidentally discharged is in a range of 0.1% to 1% of a rated capacity of said battery.

6. The apparatus according to claim 4, wherein said incidental discharging is followed by charging in such a manner that the cell voltage does not reach the value 70 mV higher than the equilibrium voltage of the battery.

* * * * *